No. 885,466. PATENTED APR. 21, 1908.
M. F. GIFFIN.
NUT LOCK.
APPLICATION FILED NOV. 4, 1907.
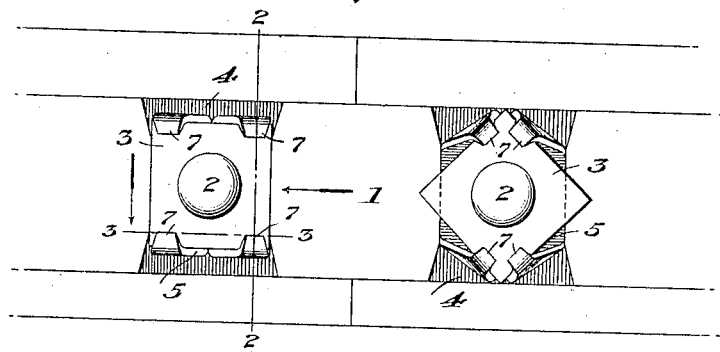
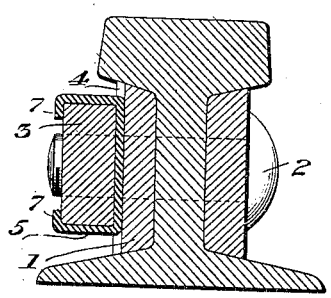 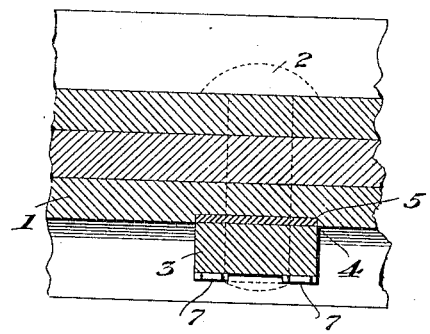
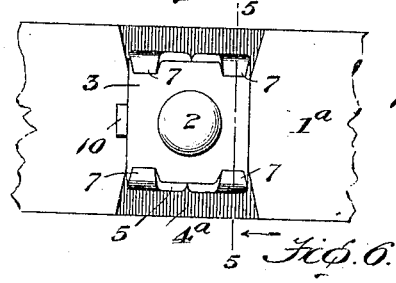 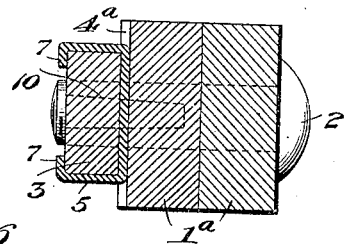
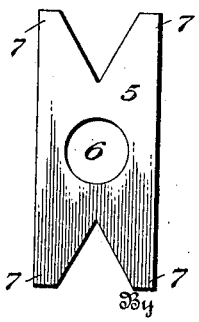
Witnesses
Inventor
Marshel F. Giffin
By Harry U. Copp
his Attorney

UNITED STATES PATENT OFFICE.

MARSHEL F. GIFFIN, OF COVE, OREGON.

NUT-LOCK.

No. 885,466.     Specification of Letters Patent.     Patented April 21, 1908.

Application filed November 4, 1907. Serial No. 400,526.

*To all whom it may concern:*

Be it known that I, MARSHEL F. GIFFIN, a citizen of the United States, residing at Cove, county of Union, and State of Oregon, have invented certain new and useful Improvements in Nut-Locks, of which the following is a specification.

My invention relates to nut-locks.

The present invention relates to that class of nut-locks embracing a washer adapted to slip over the bolt and provided with prongs to engage the nut and it has for its object the provision of a nut-lock of this type of improved construction, together with a novel construction of seat on the fish plate or other object on which the bolt is used whereby the washer is securely held and the invention further contemplates the provision of prongs sufficiently long to be bent over the outer face of the nut to thereby more securely hold it and, by reason of their greater length, obviate the necessity of completely flattening them out when it is desired to remove the nut, such complete flattening out of the prongs being a disadvantage incident to nut-locks of this character because when thus flattened out they are difficult to pry up when it is desired to reëngage them with the nut after the latter has been removed from the bolt.

The present invention is set forth fully hereinafter and its novel features are recited in the appended claims.

In the accompanying drawings:—Figure 1 is an elevation showing the nut-lock applied to the sides and corners, respectively, of different nuts on a fish plate; Fig. 2 is a section on line 2—2 of Fig. 1; Fig. 3 is a detail view on line 3—3 of Fig. 1; Fig. 4 is a detail view showing the nut-lock in use on wood; Fig. 5 is a section on line 5—5 of Fig. 4; and Fig. 6, a detail of the blank from which the nut-lock is made.

In Figs. 1 to 3, the invention is shown applied to the fish plate of an ordinary rail joint and in Figs. 4 and 5, as applied to wood.

Reference being first had to Figs. 1 to 3, the numeral 1 designates the fish plate, 2 the bolt, and 3 the nut. In the face of the fish plate there is provided a counter-sunk or recessed part 4 of substantially the thickness of the nut-lock washer 5 which is formed from a single piece of pliable or bendable sheet metal, the blank of which is shown in Fig. 6, which has an opening 6 to receive the bolt and is provided with prongs 7 which are of sufficient length so that they may be bent not only against the sides of the nut but also over the outer surface thereof.

Referring now to Figs. 4, 5, the wood to which the bolt is attached is shown at $1^a$ and it is provided with a recess $4^a$ to receive the nut-lock as already set forth, a metal wedge 10 being employed to assist in holding the nut-lock in its recess $4^a$.

By the provision of the recess which receives the nut-lock the latter is held against turning or twisting and this recess also provides a receptacle, permitting the bending down of the prongs of the nut-lock so that they need be only so far depressed as will enable the nut to be unscrewed, and it is unnecessary to completely flatten out these prongs in order that the nut may be unscrewed, the length of the prongs permitting this. Consequently the objection heretofore incident to nut-locks of this general type is obviated as the prongs of the present nut-lock can be readily bent up and over the nut on replacement of the nut on the bolt.

Having thus described my invention, what I claim as new, and desire to secure by Letters Patent, is:—

1. In a nut-lock, the combination with a bolt and nut therefor, and an object to which the bolt is attached which has a recess surrounding the bolt, of a nut-lock comprising a body having an opening to receive the bolt and provided with pairs of prongs on opposite sides of said opening, the prongs of each pair being relatively widely separated, said body being received in the recess and engaged and held by the walls thereof and the prongs being sufficiently long to be bent independently or collectively against the sides or corners and over and against the outer face of the nut.

2. In a nut-lock, the combination with a bolt and nut, and an object to which the bolt is attached which is provided with a recess, of a nut-lock having a body lying in the recess and a tongue bent against the nut, and a wedge driven into the object to which the bolt is attached and being in abutment with the outer edge of the body of the nut-lock to hold it in the recess.

In testimony whereof, I hereunto affix my signature in presence of two witnesses.

MARSHEL F. GIFFIN.

Witnesses:
   BEN CLARK,
   D. H. LAYNE.